United States Patent
Murata

(10) Patent No.: US 10,798,219 B2
(45) Date of Patent: Oct. 6, 2020

(54) SERVER AND SERVER CLIENT SYSTEM

(71) Applicant: HONDA MOTOR CO., LTD., Tokyo (JP)

(72) Inventor: Satoshi Murata, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 155 days.

(21) Appl. No.: 15/384,942

(22) Filed: Dec. 20, 2016

(65) Prior Publication Data

US 2017/0180514 A1 Jun. 22, 2017

(30) Foreign Application Priority Data

Dec. 22, 2015 (JP) ................... 2015-250670

(51) Int. Cl.
  *H04L 29/06* (2006.01)
  *H04W 4/02* (2018.01)
  (Continued)

(52) U.S. Cl.
  CPC ............ *H04L 67/42* (2013.01); *G08G 1/0112* (2013.01); *G08G 1/0129* (2013.01);
  (Continued)

(58) Field of Classification Search
  CPC ..... H04L 67/42; H04L 67/1097; H04L 67/18; G08G 1/0112; G08G 1/0129; G08G 1/0141; G08G 1/096816; H04W 4/023
  (Continued)

(56) References Cited

U.S. PATENT DOCUMENTS 8,620,532 B2 * 12/2013 Curtis ................ G06Q 30/0282
  701/50
8,880,345 B2 * 11/2014 Kazama ............. G01C 21/3461
  701/533
(Continued)

FOREIGN PATENT DOCUMENTS

JP 2005-128005 A 5/2005
JP 2008-250450 A 10/2008
(Continued)

OTHER PUBLICATIONS

Nov. 27, 2018 Office Action issued in Japanese Patent Application No. 2015-250670.

*Primary Examiner* — Vivek Srivastava
*Assistant Examiner* — Binod J Kunwar
(74) *Attorney, Agent, or Firm* — Squire Patton Boggs (US) LLP

(57) ABSTRACT

There is provided a server or the like capable of improving an estimated accuracy of a user common among a plurality of clients. According to the present invention, while a unique identifier is assigned to each of clients 210 and 220, the unique identifier is merely for identifying the client. Thus, a user of each of the clients 210 and 220 is not specified by the unique identifier, and protection of his or her privacy or personal information is ensured. Among factors of each client 210 and 220, the plurality of factors having designated relationship thereamong are extracted. A plurality of unique identifiers respectively corresponding to the extracted factors are associated with one another and are stored in the server storage device 10.

15 Claims, 7 Drawing Sheets

(51) Int. Cl.
   *G08G 1/01* (2006.01)
   *G08G 1/0968* (2006.01)
   *H04L 29/08* (2006.01)

(52) U.S. Cl.
   CPC ..... *G08G 1/0141* (2013.01); *G08G 1/096816* (2013.01); *H04L 67/1097* (2013.01); *H04L 67/18* (2013.01); *H04W 4/023* (2013.01)

(58) Field of Classification Search
   USPC .......................................... 709/203; 701/25
   See application file for complete search history.

(56) References Cited

U.S. PATENT DOCUMENTS

| | | | | |
|---|---|---|---|---|
| 9,140,566 | B1* | 9/2015 | Curtis | G06N 5/04 |
| 9,439,036 | B2* | 9/2016 | Spears | H04W 4/029 |
| 10,048,083 | B2* | 8/2018 | Inoue | B60L 1/003 |
| 2004/0122748 | A1 | 6/2004 | Donald | |
| 2010/0169131 | A1* | 7/2010 | Robertson | G06Q 10/02 |
| | | | | 705/5 |
| 2011/0196605 | A1* | 8/2011 | Severson | G01C 21/3608 |
| | | | | 701/533 |
| 2012/0042046 | A1* | 2/2012 | Petersen | G01C 21/00 |
| | | | | 709/219 |
| 2012/0173135 | A1* | 7/2012 | Gutman | G01C 21/3469 |
| | | | | 701/408 |
| 2012/0215441 | A1* | 8/2012 | Hayakawa | G01C 21/32 |
| | | | | 701/428 |
| 2013/0179067 | A1* | 7/2013 | Trowbridge | G01C 21/3484 |
| | | | | 701/410 |
| 2014/0336992 | A1* | 11/2014 | Kling | G06Q 10/06 |
| | | | | 703/1 |
| 2015/0046087 | A1* | 2/2015 | Nogawa | G01C 21/3691 |
| | | | | 701/522 |
| 2015/0204658 | A1* | 7/2015 | Tamura | G06F 3/0418 |
| | | | | 356/614 |
| 2015/0204685 | A1* | 7/2015 | Gearhart | G01C 21/36 |
| | | | | 701/533 |
| 2015/0226570 | A1* | 8/2015 | Takei | G01C 21/3484 |
| | | | | 701/454 |
| 2015/0289250 | A1* | 10/2015 | Ishizu | H04W 4/024 |
| | | | | 455/452.1 |
| 2015/0338219 | A1* | 11/2015 | Wang | G01C 21/3697 |
| | | | | 701/537 |
| 2016/0009276 | A1* | 1/2016 | Moeller | G06F 16/162 |
| | | | | 701/41 |
| 2016/0061621 | A1* | 3/2016 | Hawkins | G01C 21/3629 |
| | | | | 701/408 |
| 2016/0216125 | A1* | 7/2016 | Ahn | G06Q 50/30 |
| 2016/0216129 | A1* | 7/2016 | Takei | G01C 21/32 |
| 2017/0010116 | A1* | 1/2017 | Inoue | B60L 1/003 |

FOREIGN PATENT DOCUMENTS

| | | |
|---|---|---|
| JP | 2011242959 A | 12/2011 |
| JP | 2014-102680 A | 6/2014 |
| JP | 2014160420 A | 9/2014 |
| WO | 2010076840 A1 | 7/2010 |
| WO | WO 2013/030942 A1 | 3/2013 |

* cited by examiner

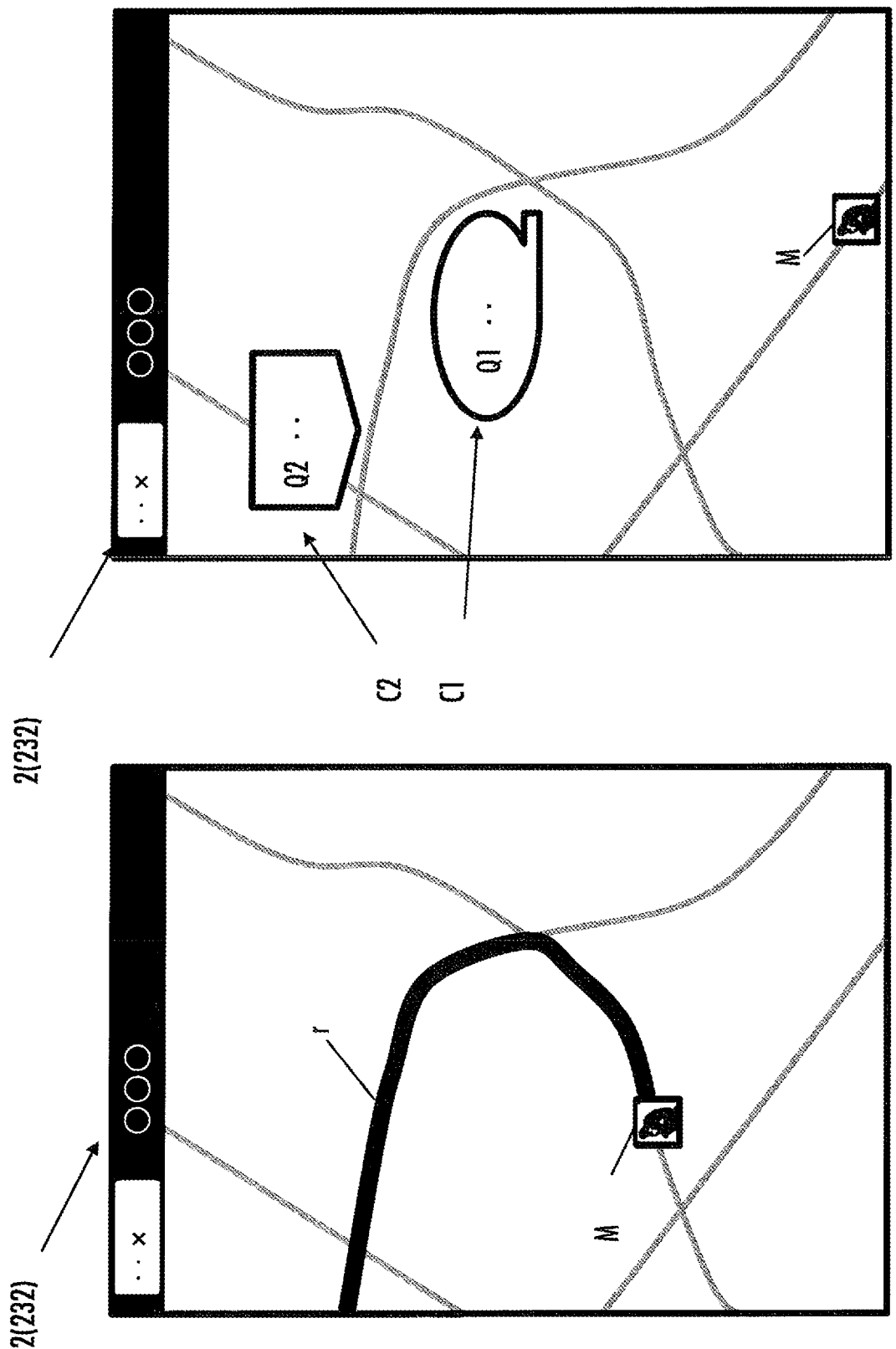

SERVER AND SERVER CLIENT SYSTEM

BACKGROUND OF THE INVENTION

Field of the Invention

The present invention relates to a server having a function of communication with a plurality of clients serving as mobile stations, and a system including the server and the plurality of clients.

Description of the Related Art

A technique for comparing a movement history during movement with a movement accumulation for each user to specify the user, accumulating the movement history in a movement history accumulation unit to grasp the specification of the user, and automatically determining stealing has been proposed (see Japanese Patent Laid-Open No. 2005-128005).

A technique for specifying a departure spot or a destination spot of a vehicle, estimating, if the spot exists in a predetermined area at a predetermined frequency, that the vehicle is a vehicle of a person having a base in the area, and if a path time of the vehicle satisfies a predetermined condition when an area detour route candidate is extracted, selecting the area detour route candidate as a detour route, has been proposed (see Japanese Patent Laid-Open No. 2008-250450).

A technique for learning an arrival and departure spots of a user and estimating, if a distribution of arrival spots scattered from a common a departure spot is relatively large, the departure spot as a departure and arrival point of a user's behavior, has been proposed (see International Publication No. WO 2013/030942).

A technique for classifying data of a own vehicle into data including individually specific information and the data not including individually specific information, and transmitting the data to a server, has been proposed (see Japanese Patent Laid-Open No. 2014-102680).

However, it is possible (highly possible) that regardless of the same user or users societally associated with one another using a plurality of clients, the users of each of the plurality of clients are determined to be users independent of one another. Thus, when a content service is provided to each of the clients, there is a possibility that the service may contain something low in usefulness (noise) for each of the users in large quantity.

The present invention is directed to providing a server or the like capable of improving an estimated accuracy of a user common among a plurality of clients.

SUMMARY OF THE INVENTION

A server according to the present invention includes a server storage device, a first server arithmetic processing element configured to respectively assign different unique identifiers to a plurality of clients serving as mobile stations based on communication with each of the plurality of clients, and then combine and recognize a combination of a factor relating to states set or detected in each of the plurality of clients and the unique identifier, and a second server arithmetic processing element configured to extract, among the respective factors in the plurality of clients recognized by the first server arithmetic processing element, the plurality of factors having a designated relationship thereamong, associate a plurality of unique identifiers, which are respectively combined with the plurality of factors and recognized, and store the associated unique identifiers in the server storage device, in which the second server arithmetic processing element evaluates a degree of approximation among the respective factors in the plurality of clients recognized by the first server arithmetic processing element, and extracts the plurality of factors with the degree of approximation being a reference value or more, as the plurality of factors having the designated relationship thereamong. In the server or the like in a preferable aspect of the present invention, the second server arithmetic processing element extracts the plurality of factors with the degree of approximation being a reference value or more over a designated frequency or more as the plurality of factors having the designated relationship thereamong.

A server client system according to the present invention includes the server according to the present invention and the plurality of clients.

In the server according to the present invention and the server client system having the server as a component (hereinafter referred to as a "server or the like"), the first server arithmetic processing element assigns a unique identifier to each of the clients. The unique identifier is merely for identifying each of the clients. Therefore, a user (a natural person or a juridical person) of each of the clients is not specified by the unique identifier, and protection of his or her privacy or personal information is ensured.

Among the respective factors relating to detected states or set states in the clients, which have been recognized by the first server arithmetic processing element, the plurality of factors having the designated relationship thereamong are extracted by the second server arithmetic processing element. The plurality of unique identifiers respectively corresponding to the plurality of factors extracted by the second server arithmetic processing element are associated with one another and are stored in the server storage device. When the plurality of factors have the designated relationship thereamong, users of each of the plurality of clients respectively corresponding to the plurality of factors are highly probable to have any relationship or commonality, e.g., the same person, acquaintances, friends, persons common in affiliation, or relatives.

Accordingly, the server or the like according to the present invention enables the unique identifier assigned to each of the plurality of clients of the users who are highly probable to have any relationship or commonality to be registered in the server storage device in an appropriate format from the viewpoint of an improvement in usefulness of a service such as a content provided to the client, for example.

If the degree of approximation among the plurality of factors is high, users of each of the plurality of clients respectively corresponding to the plurality of factors are highly probable to have any relationship, e.g., are similar or common in a form of behavior or preference. Accordingly, the server or the like having such a configuration enables the unique identifier assigned to each of the plurality of clients of the users who are highly probable to have any relationship to be further registered in the server storage device in an appropriate format from the viewpoint of an improvement in usefulness of a service such as a content provided to the client, for example.

The detection of the state by the client is a concept also including the client reading out a newest detection result of the state from a client storage device in addition to newly detecting the state.

In the server or the like according to the one aspect of the present invention, the first server arithmetic processing element respectively recognizes a first ending point state which is a target state set in a first client constituting the plurality of clients and a second ending point state serving as a state corresponding to the first ending point state detected in a second client constituting the plurality of clients, the second client being separate from the first client, as the factors which are determined whether or not having the designated relationship therebetween by the second server arithmetic processing element.

If the first ending point state (a target state set in the first client) and the second ending point state (a state corresponding to the target state detected in the second client) have the designated relationship therebetween, the respective users of the first and second clients are highly probable to have any relationship or communality with respect to the ending point state. Accordingly, the server or the like having such a configuration enables the unique identifier assigned to each of the first and second clients to be registered in the server storage device in an appropriate format from the viewpoint of an improvement in usefulness of a service provided to the client, for example.

In the server or the like according to the one aspect of the present invention, the first server arithmetic processing element respectively recognizes a first starting point state which is a state detected in setting the first ending point state in the first client and a second starting point state which is a state, corresponding to the first starting point state, and detected in the second client, as the factors which are determined whether or not having the designated relationship therebetween by the second server arithmetic processing element.

If the first starting point state (the state detected in setting the first ending point state in the first client) and the second starting point state (the state, corresponding to the first starting point state, detected in the second client) have the designated relationship therebetween, the respective users of the first and second clients are highly probable to have any relationship or communality with respect to the starting point states. Accordingly, the server or the like having such a configuration enables the unique identifier assigned to each of the first and second clients to be registered in the server storage device in an appropriate format from the viewpoint of an improvement in usefulness of a service provided to the client, for example.

In the server or the like according to the one aspect of the present invention, the first server arithmetic processing element respectively recognizes a first starting point time corresponding to a set time of the first ending point state or a detection time of the first starting point state in the first client and a second starting point time corresponding to a detection time when the second starting point state in the second client as the factors which are determined whether or not having the designated relationship therebetween by the second server arithmetic processing element.

If the first starting point time (the time corresponding to the time when the first ending point state is set, for example, in the first client) and the second starting point time (the time corresponding to the time when the second starting point state is detected in the second client) have the designated relationship therebetween, the respective users of the first and second clients are highly probable to have any relationship or communality with respect to the starting point states. Accordingly, the server or the like having such a configuration enables the unique identifier assigned to each of the first and second clients to be registered in the server storage device in an appropriate format from the viewpoint of an improvement in usefulness of a service provided to the client, for example.

In the server or the like according to the one aspect of the present invention, the first server arithmetic processing element recognizes a first ending point time corresponding to a time when the first ending point state is implemented in the first client as the factor in the first client, and respectively recognizes a second ending point time corresponding to a detection time of the second ending point state in the second client as the factors which are determined whether or not having the designated relationship therebetween by the second server arithmetic processing element.

If the first ending point time (the time corresponding to the time when the first ending point state is implemented in the first client) and the second ending point time (the time corresponding to the time when the second ending point state is detected in the second client) have the designated relationship therebetween, the respective users of the first and second clients are highly probable to have any relationship or communality with respect to the ending point states. Accordingly, the server or the like having such a configuration enables the unique identifier assigned to each of the first and second clients to be registered in the server storage device in an appropriate format from the viewpoint of an improvement in usefulness of a service provided to the client, for example.

In the server or the like according to the one aspect of the present invention, the first server arithmetic processing element respectively recognizes the first starting point time corresponding to a set time of the first ending point state or a detection time of the first starting point state in the first client and the second ending point time corresponding to a detection time of the second ending point state in the second client as the factors, and the second server arithmetic processing element extracts the factor in the first client and the factor in the second client as the plurality of factors having the designation relationship therebetween when a deviation between the first starting point time and the second ending point time is in a designated range corresponding to a deviation between the first starting point state or the second starting point state and the first ending point state or the second ending point state.

If the deviation (a time difference) between the first starting point time and the second ending point time is included in a designated range corresponding to a time difference required for transition from the starting point state to the ending point state, which is estimated based on the deviation between the first or second starting point state and the first or second ending point state, the respective users of the first and second clients are highly probable to have any relationship or communality with respect to the starting point states and the ending point states. Accordingly, the server or the like having such a configuration enables the unique identifier assigned to each of the first and second clients to be registered in the server storage device in an appropriate format from the viewpoint of an improvement in usefulness of a service provided to the client, for example.

In the server or the like according to the one aspect of the present invention, the first server arithmetic processing element recognizes a start up time of a moving body loaded with the second client as the second starting point time.

If there is a designated relationship between the time when the first starting point state is detected by the first client and the time when the moving body loaded with the second client starts up, the respective users of the first and second clients are highly probable to have any relationship or communality with respect to the starting point state. Accordingly, the server or the like having such a configuration enables the unique identifier assigned to each of the first and second clients to be registered in the server storage device in an appropriate format from the viewpoint of an improvement in usefulness of a service provided to the client, for example.

In the server or the like according to the one aspect of the present invention, the first server arithmetic processing element recognizes a stop operation time of the moving body loaded with the second client as the second ending point time.

If there is a designated relationship between the time when the first ending point state is implemented by the first client and the time when the moving body loaded with the second client stops operating, the respective users of the first and second clients are highly probable to have any relationship or communality with respect to the ending point state. Accordingly, the server or the like having such a configuration enables the unique identifier assigned to each of the first and second clients to be registered in the server storage device in an appropriate format from the viewpoint of an improvement in usefulness of a service provided to the client, for example.

In the server or the like according to the one aspect of the present invention, a first server arithmetic processing element recognizes the time when a communication state with the second client in the first client has been established as the first starting point time.

If there is a designated relationship between the time when the communication state with the second client has been established by the first client and the time when the second starting point state is detected by the second client, the respective users of the first and second clients are highly probable to have any relationship or communality with respect to the starting point state. Accordingly, the server or the like having such a configuration enables the unique identifier assigned to each of the first and second clients to be registered in the server storage device in an appropriate format from the viewpoint of an improvement in usefulness of a service provided to the client, for example.

In the server or the like according to the one aspect of the present invention, the first server arithmetic processing element recognizes a time when a communication state with the second client in the first client has been released as a first ending point time.

If there is a designated relationship between the time when the communication state with the second client has been released by the first client and the time when the second ending point state is detected by the second client, the respective users of the first and second clients are highly probable to have any relationship or communality with respect to the starting point state. Accordingly, the server or the like having such a configuration enables the unique identifier assigned to each of the first and second clients to be registered in the server storage device in an appropriate format from the viewpoint of an improvement in usefulness of a service provided to the client, for example.

In the server according to the one aspect of the present invention, the first server arithmetic processing element respectively recognizes positions set or detected in the plurality of clients as the factors which are determined whether or not having the designated relationship by the second server arithmetic processing element.

According to the server or the like having such a configuration, if there is a designated relationship between the detected positions or the set positions, the respective users of the clients are highly probable to have any relationship or communality in view of the positions. Accordingly, the server or the like having such a configuration enables the unique identifier assigned to each of the clients to be registered in the server storage device in an appropriate format from the viewpoint of an improvement in usefulness of a service provided to the client, for example.

In the server or the like according to the one aspect of the present invention, the first server arithmetic processing element respectively assigns the unique identifier to each of the plurality of clients depending on first use of a designated function or a designated application for detecting or setting the state in each of the plurality of clients.

According to the server or the like having such a configuration, in the first use of the designated function or the like in each of the clients, the unique identifier, which is assigned only to identify the client and so that protection of privacy or personal information of the user of the client is ensured, is assigned to the client. The unique identifier is used as a common unique identifier recognized by the first server arithmetic processing element while being combined with the detected or set state in the subsequent use of the designated function or the like.

In the server or the like according to the one aspect of the present invention, the first server arithmetic processing element is configured to provide, based on communication with at least one of the plurality of clients constituting a client group respectively assigned with the plurality of unique identifiers associated with one another and stored by the server storage device, an application or a content corresponding to at least one of the factor and the designated relationship to the at least one client.

According to the server or the like having such a configuration, an application (application software) or a content is provided to at least one of the clients respectively assigned the unique identifiers associated with one another and registered in the server storage device. Thus, the usefulness of the application or the content provided via the at least one client can be improved for the users who are highly probable to have any relationship thereamong.

BRIEF DESCRIPTION OF THE DRAWINGS

FIG. 7A is a diagram illustrating a first output format of a content in the client; and FIG. 7B is a diagram illustrating a second output format of the content in the client.

DETAILED DESCRIPTION OF THE PREFERRED EMBODIMENTS (Configuration of Server Client System)

Figure 1:
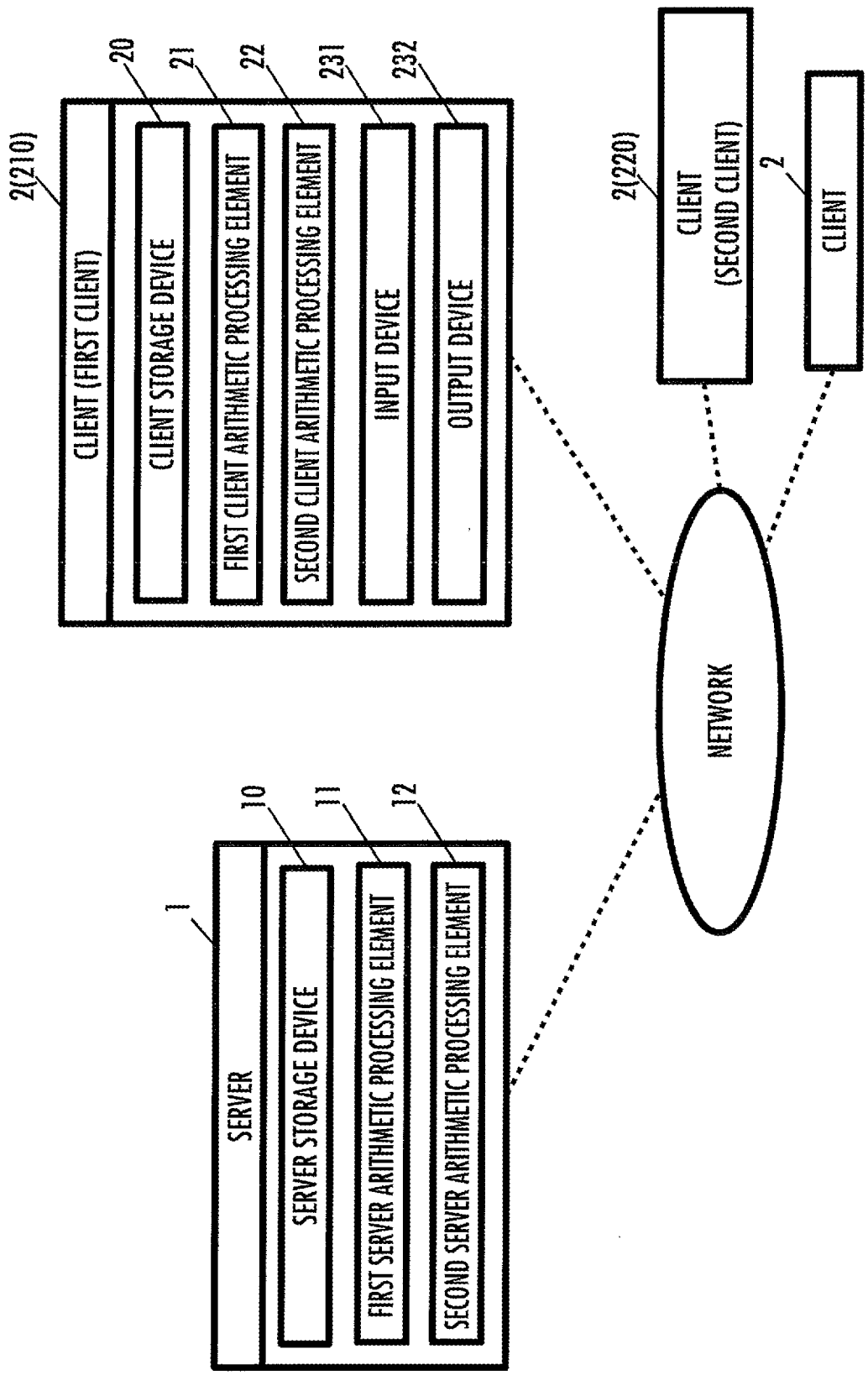
FIG. 1 is a diagram illustrating a configuration of a server client system according to an embodiment of the present invention.

A server client system according to an embodiment of the present invention illustrated in FIG. 1 includes a server 1 and a plurality of clients 2 serving as mobile stations. The server 1 and each of the plurality of clients 2 are communicable with each other via one or more networks. The plurality of clients 2 include a first client 210 and a second client 220. The first client 210 includes an information terminal carried by a user. The second client 220 is temporarily or permanently loaded into a moving body serving as a device having a function moving according to a user's operation, e.g., vehicles such as a four-wheeled vehicle, a two-wheeled vehicle, and a bicycle.

(Configuration of Server)

The server 1 includes a computer serving as a fixed station, and includes a server storage device 10, a first server arithmetic processing element 11, and a second server arithmetic processing element 12. The server 1 may include a portable terminal device such as a smartphone or a tablet serving as a mobile station.

The server storage device 10 stores and holds in association respective states of the clients 2 recognized by the first server arithmetic processing element 11 and respective unique identifiers assigned thereto, as well as a plurality of unique identifiers associated with or instructed to be associated with one another by the second server arithmetic processing element 12. The server storage device 10 further stores and holds road traffic information and server map information. The "road traffic information" includes a movement cost $S(k)$ in each of links $L(k)$ constituting a road. The "server map information" includes link identification information for identifying each of the links $L(k)$ and data representing an attribute in addition to a string of coordinate values ((latitude, longitude) or (latitude, longitude, height)) representing a position, a shape, a posture, and the like of the link $L(k)$. The links are connected to one another via a node.

Each of the first server arithmetic processing element 11 and the second server arithmetic processing element 12 includes a central processing unit (CPU) which reads software and data, as needed, from a designated region of a memory constituting the server storage device 10, and then performs designated arithmetic processing according to the software using the data as a target and a communication device, a storage device (memory), and the like, as needed. Details of the designated arithmetic processing will be described below.

(Configuration of Client)

The client 2 includes a portable type terminal device such as a smartphone or a tablet serving as a mobile station. "Portable type" means that its size is almost the size of the palm of a standard person's hand and its weight is low enough to easily carry in one hand or in a pocket of clothes. The client 2 may include a device (e.g., a device incorporated into a moving body) larger in size and heavier in weight than a portable device.

The client 2 includes a client storage device 20, a first client arithmetic processing element 21, and a second client arithmetic processing element 22.

The client storage device 20 is configured to store and hold receiving information by the first client arithmetic processing element 21 and the second client arithmetic processing element 22 and an arithmetic processing result such as a calculation result. The client storage device 20 in the first client 210 is configured to store client map information and a content. The "client map information" includes a coordinate string representing a position, a shape, a posture, and the like of each of links constituting a road and link identification information for identifying the link.

The client map information may not include the coordinate string but may include image information for displaying a map on an output device 232 and link identification information on each of links constituting a road included in the map. In this case, the server 1 may specify a coordinate value, which matches a coordinate value included in probe information or request information, among coordinate values included in server map information, to specify link identification information, a road type, and the like corresponding to the specified coordinate value.

The client map information and the server map information differ in spec (specification) and data structure. Therefore, even if the respective coordinate strings in the client map information and the server map information differ in definition or the like, the same links can match each other by being assigned common link identification information. The server 1 transmits server route information including the link identification information, and the client 2 displays an image of a navigation route including a plurality of links identified by the link identification information included in the server route information via the output device 232.

The "content" includes a content recognized via a sense of seeing, e.g., an image content (a still image and a moving image) as well as a content recognized via a sense of hearing, such as an acoustic content (a music piece and an operation sound, etc.) and an entertainment content obtained by combining the contents. The image content also includes a part of the client map information as well as a client route displayed while being overlaid on the client information.

The first client arithmetic processing element 21 is configured to measure or detect a current position of the client 2 in a time-series manner. The current position of the client 2 is measured based on an output signal of a gyro sensor, as needed, in addition to a signal received from a satellite by a GPS (Global Positioning System) receiver. A first client arithmetic processing element 21 in the second client 220 is configured to transmit "probe information" representing a time-series change manner of a position of the second client 220 to the server 1. The first client arithmetic processing element 21 in the second client 220 is configured to detect start (IGN OFF→ON) and operation stop (IGN ON→OFF) of a moving body such as a vehicle loaded with the second client 220.

The second client arithmetic processing element 22 in the first client 210 is configured to transmit a "route search request" to the server 1 and receive "server route information" corresponding thereto from the server 1. The second client arithmetic processing element 22 in the first client 210 is configured to search for a client route using client map information and output the client route searched for to the output device 232 based on the server route information.

The client 2 further includes an input device 231 and the output device 232. The input device 231 includes an operation button and a microphone, and enables various operations or input settings by a user's operation or speech. The output device 232 includes a display device and an acoustic output device (speaker), and displays the image content such as the client map information or outputs the acoustic content. Each of the input device 231 and the output device 232 may include a touch panel display.

A component in the present invention "outputting" information means outputting information in all formats which a person can recognize via his or her five senses such as senses of seeing, hearing, and touching, e.g., display of the information, speech output, and vibration output. The component in the present invention being "configured" to perform arithmetic processing in charge means that the component has a function of reading a required program and data from a memory, for example, and then performing the arithmetic processing in charge according to the program based on the data, and thus is programmed.

(Function)

A function of the navigation system having the above-described configuration will be described. First, in the first client 210, a navigation or route search function serving as a first designated function is used via the input device 231 by the user (STEP 210 in FIG. 2). When the first designated function is used, a first designated application installed in the first client 210 is started up. The first client 210 starts access to or mutual communication with the server 1, triggered by the startup of the first designated application (Arrow X11 in FIG. 2).

Figure 2:
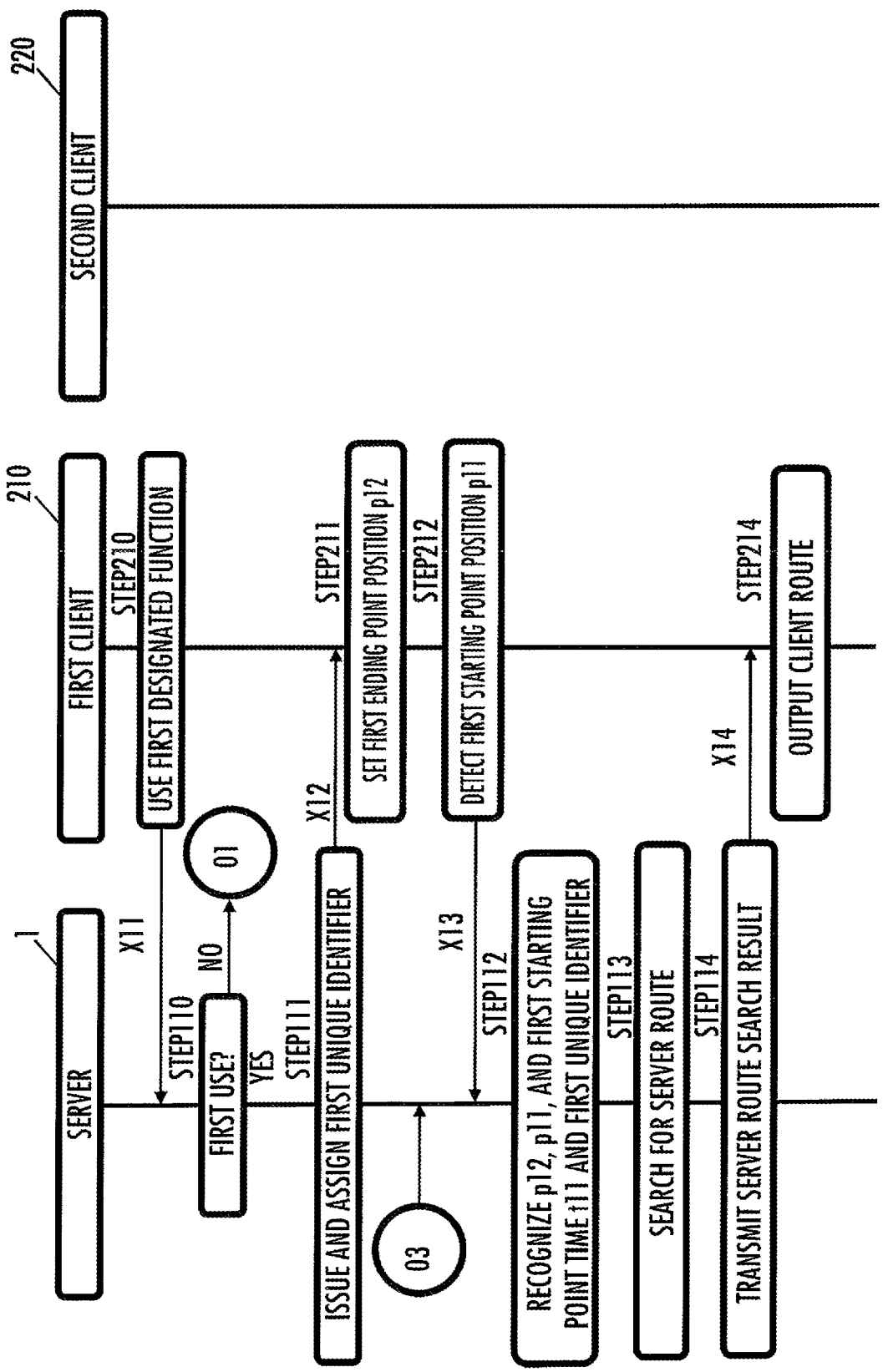
FIG. 2 is a diagram illustrating a first cooperative function of a server and a first client.

In response to this, in the server 1, the first server arithmetic processing element 11 determines whether the number of times of cumulative use of the first designated function in the first client 210 is "0", i.e., the use is first use based on communication with the first client 210 (STEP 110 in FIG. 2). For example, the first server arithmetic processing element 11 determines whether the number of times of cumulative use is one or more or zero depending on whether the first client 210 is assigned a first unique identifier based on the communication with the first client 210.

If the determination result is affirmative (YES in STEP 110 in FIG. 2), the first server arithmetic processing element 11 assigns a specific identifier (a first specific identifier) to the first client 210 based on the communication with the first client 210 (STEP 111 and Arrow X12 in FIG. 2).

In the first client 210, a target spot is set as a first ending point position p12 (a first ending point state) via the input device 231 by the user according to an input system to be output to the output device 232 according to the first designated function or the first designated application (STEP 211 in FIG. 2). In response to this, the first client arithmetic processing element 21 measures a current position of the first client 210 as a first starting point position p11 (a first starting point state) or reads out a newest position measurement result as the first starting point position p11 from the client storage device 20 (STEP 212 in FIG. 2).

Moreover, the first client arithmetic processing element 21 associates a first factor (the first ending point position p12 (the first ending point state), the first starting point position p11 (the first starting point state), and a first starting point time t11) and the first unique identifier in response to an instruction via the input device 231 automatically or by the user, and transmits the first factor and the first unique identifier to the server 1 (as a route search request) (Arrow X13 in FIG. 2). As the first starting point time t11, the time when the first designated application starts up, the time when the first ending point position p12 is set, the time when the first starting point position p11 is detected, or the time when the route search request is transmitted, for example, is adopted. The first starting point position p11 may be set via the input device 231 by the user. The first ending point position p12 (the target spot), the first starting point position p11 (a departure spot), and the first starting point time t11, which are associated with one another, may be not collectively but respectively transmitted as separate information, together with the first unique identifier, to the server 1.

The first factor may further include a first ending point time t12. As the first ending point time t12, a predicted arrival time calculated by the server 1 or the first client 210 (or the first client arithmetic processing element 21) or a desired arrival time to the first ending point position p12 set via the input device 231 by the user, for example, is adopted. The first factor may include at least one of the first ending point position p12, the first starting point position p11, the first starting point time t11, and the first ending point time t12.

In the server 1, the first server arithmetic processing element 11 recognizes the first factor (the first ending point position p12 (the first ending point state), the first starting point position p11 (the first starting point state), the first starting point time t11) and the first unique identifier (STEP 112 in FIG. 2).

Figure 6:
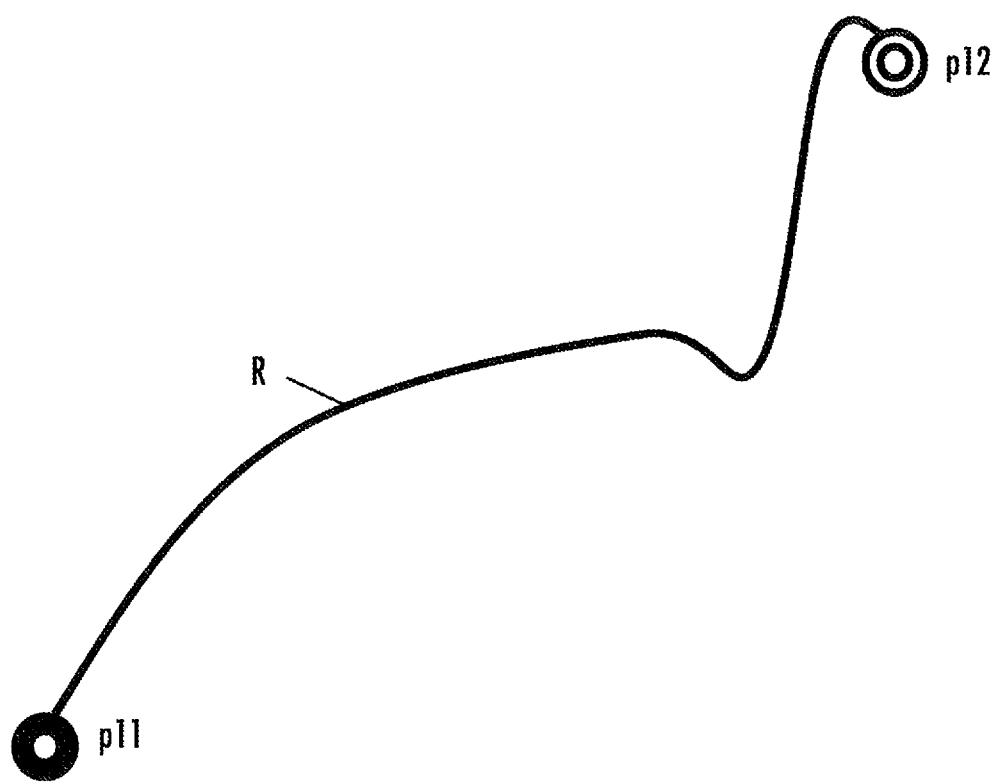
FIG. 6 is a diagram illustrating a method for searching for a server route.

Moreover, the first server arithmetic processing element 11 searches for one or more server routes R each including a plurality of link groups connecting the first starting point position p11 and the first ending point position p12 of the first client 210 (STEP 113 in FIG. 2). Thus, the server route R as illustrated in FIG. 6 is obtained as a search result. When the server route R is searched for, the server map information and the movement cost S(k) in each of the links L(k) are used. A route in which a total of movement costs reaches a minimum is searched for as the server route R. The movement cost is a concept including at least one of a movement distance, a difficulty in driving (whether the number of curves is large or small, whether the width of road is large or small, etc.), an amount of energy required for movement (a fuel bill, etc.), and a road toll in addition to an amount of time required for movement.

The first server arithmetic processing element 11 generates server route information representing a search result of the server route R, and then transmits the server route information to the first client 210 identified by the first unique identifier (STEP 114 and Arrow X14 in FIG. 2). The "server route information" includes link identification information on at least some of links in a series of link groups constituting the server route R or a coordinate value of each of a plurality of discrete spots on the server route R.

In the first client 210, the second client arithmetic processing element 22 receives the server route information. The second client arithmetic processing element 22 calculates a client route r connecting the first starting point position p11 (or a newest current spot after a set time point of the first starting point position p11 (the departure spot)) and the first ending point position p12 using the client map information based on the server route information, and then outputs the calculated client route r to the output device 232 (STEP 214 in FIG. 2).

For example, the client route r is searched for so that links identified based on link identification information included in the server route information or a plurality of spots represented by coordinate values are included (at least a part of the server route R is reproduced). Thus, the client route r, together with a mark M representing a current spot of the first client 210, is overlaid on the client map, and is displayed on a display constituting the output device 232, as illustrated in FIG. 7A.

On the other hand, the moving body loaded with the second client 220 is started (the IGN switch of the vehicle is switched from an OFF state to an ON state). The second client 220 is turned on by power supplied from a power source (not illustrated) loaded into the moving body. In this state, in the second client 220, a probe information transmission function serving as a second designated function is used via the input device 231 by the user (STEP 220 in FIG. 3). When the second designated function is used, a second designated application installed in the second client 220 is started up. The second client 220 starts access to or mutual communication with the server 1, triggered by the startup of the second designated application (Arrow X21 in FIG. 3).

Figure 3:
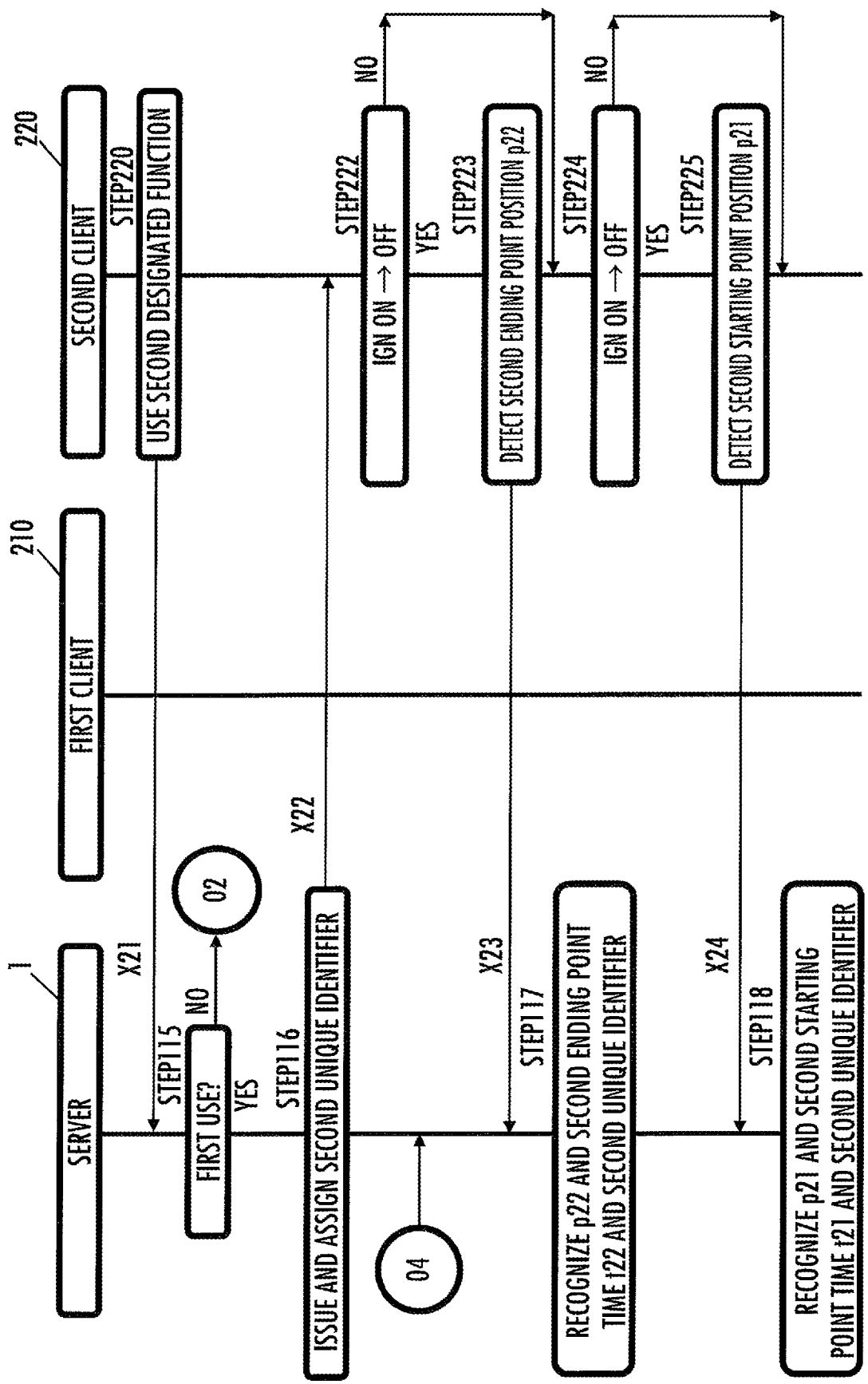
FIG. 3 is a diagram illustrating a first cooperative function of the server and a second client.

In response to this, in the server 1, the first server arithmetic processing element 11 determines whether the number of times of cumulative use of the second designated function in the second client 220 is "0", i.e., the use is first use based on the communication with the second client 220 (STEP 115 in FIG. 3). For example, it is determined whether the number of times of the cumulative use is one or more or zero depending on whether the second unique identifier is assigned based on the communication with the second client 220.

If the determination result is affirmative (YES in STEP 115 in FIG. 3), the second server arithmetic processing element 12 assigns a unique identifier (a second unique identifier) to the second client 220 based on the communication with the second client 220 (STEP 116 and Arrow X22 FIG. 3).

The first client arithmetic processing element 21 generates probe information and transmits the generated probe information to the server 1 according to the second designated function. The "probe information" includes a time series of measurement results of the current position of the second client 220 (or link identification information corresponding thereto). For example, the current probe information is transmitted, triggered by a designated period of time having been elapsed from the previous time of transmission of the probe information, a movement distance of the moving body from the previous transmission time of the probe information having reached a designated distance, or an information amount of the probe information having reached a predetermined amount. The "probe information" further includes the second unique identifier.

In the second client 220, the first client arithmetic processing element 21 determines whether the moving body has been switched from an operating state to an operation stop state (the IGN switch of the vehicle has been switched from an ON state to an OFF state) (STEP 222 in FIG. 3). If the determination result is affirmative (YES in STEP 222 in FIG. 3), the first client arithmetic processing element 21 detects a position of the second client 220 at that time point as a second ending point position p22 (a second ending point state) (or reads out a final position measurement result as the second ending point position p22 from the client storage device 20) (STEP 223 in FIG. 3). The first client arithmetic processing element 21 associates a second factor (the second ending point position p22 and a second ending point time t22) and a second unique identifier with each other, and transmits the second factor and the second unique identifier (as newest probe information) to the server 1 (Arrow X23 in FIG. 3). As the second ending point time t22, the time when the moving body has been switched from the operating state to the operation stop state, the time when the second ending point position p22 or the like is transmitted to the server 1, or the time when the second ending point position p22 is detected, for example, is adopted. If the determination result is negative (NO in STEP 222 in FIG. 3), the first client arithmetic processing element 21 neither detects nor transmits the second ending point position p22 (the second ending point state).

In the server 1, the first server arithmetic processing element 11 recognizes the second ending point position p22 (the second ending point state) and the second ending point time t22, and the second unique identifier (STEP 117 in FIG. 3).

The first client arithmetic processing element 21 determines whether the moving body has been switched from the operation stop state to the operating state (the IGN switch of the vehicle has been switched from an OFF state to an ON state) (STEP 224 in FIG. 3). If the determination result is affirmative (YES in STEP 224 in FIG. 3), the first client arithmetic processing element 21 detects a position of the second client 220 at that time point as a second starting point position p21 (a second starting point state), or reads out a final position measurement result as the second starting point position p21 from the client storage device 20 (STEP 225 in FIG. 3). The first client arithmetic processing element 21 associates a second factor (the second starting point position p21 and a second starting point time t21) and a second unique identifier with each other, and transmits the second factor and the second unique identifier (as newest probe information) to the server 1 (Arrow X24 in FIG. 3). As the second starting point time t21, the time when the moving body has been switched from an operation stop state to an operating state, the time when the second starting point position p21 or the like is transmitted to the server 1, or the time when the second starting point position p21 is detected, for example, is adopted. If the determination result is negative (NO in STEP 224 in FIG. 3), the first client arithmetic processing element 21 neither detects nor transmits the second starting point position p21 (the second starting point state).

The second factor may include at least one of the second starting point position p21, the second ending point position p22, the second starting point time t21, and the second ending point time t22. When the second factor includes only the second ending point position p22 and the second ending point time t22, for example, processing relating to the detection of the second starting point position p21 may be omitted (see STEP 224, STEP 225, and Arrow X24 in FIG. 3).

In the server 1, the first server arithmetic processing element 11 recognizes the second starting point position p21 (the second starting point state) and the second starting point time t21, and the second unique identifier (STEP 118 in FIG. 3).

Figure 4:
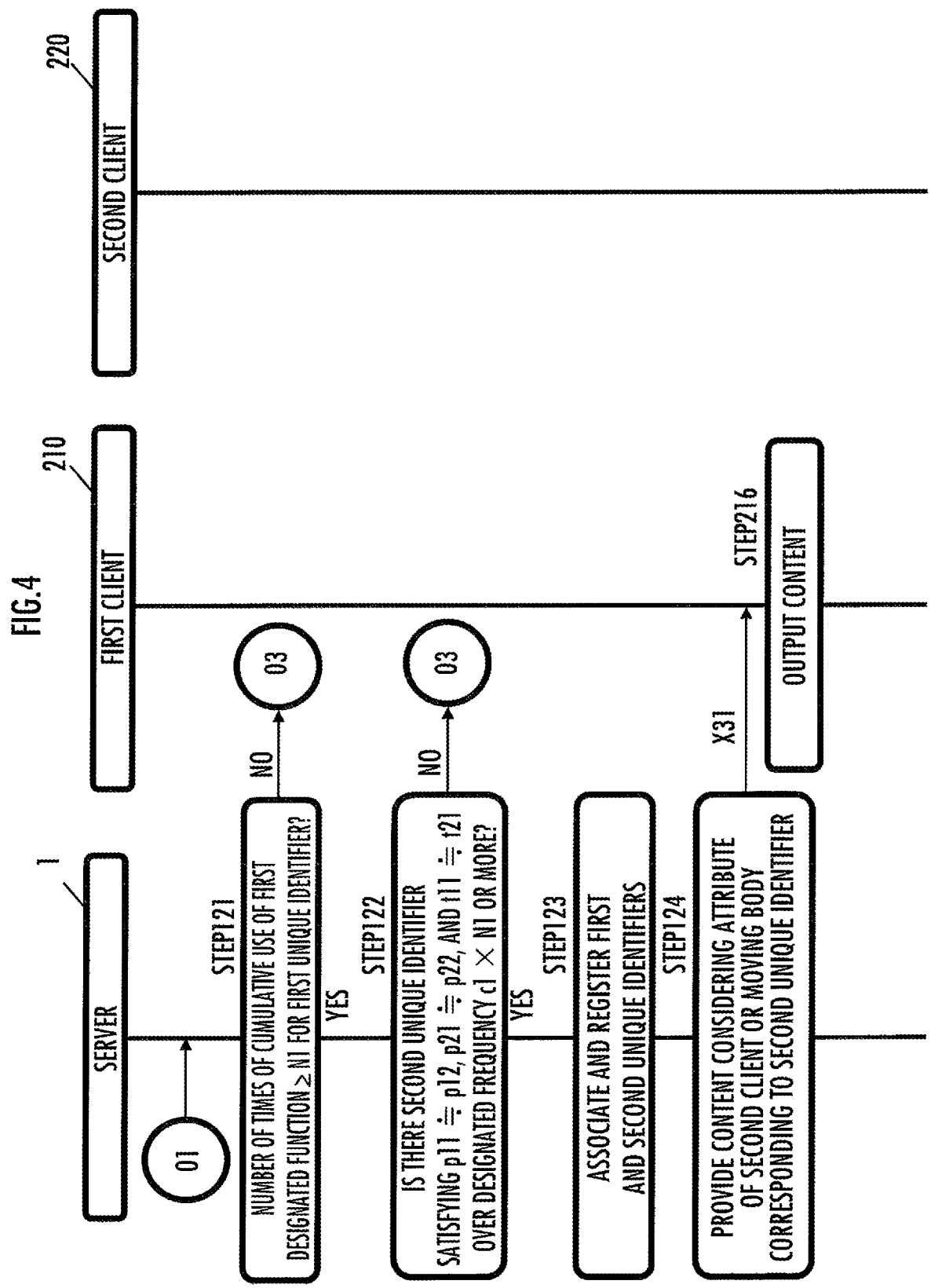
FIG. 4 is a diagram illustrating a second cooperative function of the server and the first client.

In the server 1, if it is determined that the number of times of cumulative use of the first designated function in the first client 210 is one or more (NO in STEP 110 in FIG. 2), the first server arithmetic processing element 11 determines whether the number of times is N1(>2) or more (STEP 121 in FIG. 4).

If the determination result is negative (NO in STEP 121 in FIG. 4), the first server arithmetic processing element 11 performs processing for recognizing the first ending point position p12 or the like, for example, based on the communication with the first client 210, as described above (see STEPs 112 to 114 in FIG. 2). On the other hand, if the determination result is affirmative (YES in STEP 121 in FIG. 4), the second server arithmetic processing element 12 determines the presence or absence of the second client 220 having the second factor (the second starting point position p21, the second ending point position p22, and the second starting point time t21) the degree of approximation from the first factor (the first starting point position p11, the first ending point position p12, and the first starting point time t11) identified by the first unique identifier of which is a reference value or more over a first designated frequency $c1 \times N1 (0 < c1 \leq 1)$ or more (STEP 122 in FIG. 4).

The degree of approximation between the factors is defined as a function of one variable or a function of many variables using one or more variables constituting the factor as a main variable. For example, the degree of approximation may be defined so that the shorter a geographical distance between the first starting point position p11 and the second starting point position p21 is, the more continuously or intermittently the degree of approximation increases. The degree of approximation may be defined to become a positive value only when areas respectively including the first starting point position p11 and the second starting point position p21 are the same (and are adjacent to each other) and become zero in the other case. The degree of approximation may be defined so that the closer area attributes (represented as scalers or vectors using continuous variables or discrete variables as elements) respectively including the first starting point position p11 and the second starting point position p21 are, the more continuously or intermittently the degree of approximation increases. Between the first ending point position p12 and the second ending point position p22, the degree of approximation may be defined similarly to that between the first starting point position p11 and the second starting point position p21. The degree of approximation may be defined so that the shorter a deviation between the first starting point time t11 and the second starting point time t21 is, the more continuously or intermittently the degree of approximation increases. The degree of approximation may be defined so that the closer attributes of time slots (represented as scalers or vectors using continuous variables or discrete variables as elements) respectively including the first starting point time t11 and the second starting point time t21 are, the more continuously or intermittently the degree of approximation increases. A norm between points respectively representing the first factor and the second factor as a multidimensional vector in a Hilbert space or an inner product of the vector may be evaluated as the degree of approximation between the first factor and the second factor.

If the determination result is negative (NO in STEP 122 in FIG. 4), the first server arithmetic processing element 11 performs processing for recognizing the first ending point position p12 or the like, for example, based on the communication with the first client 210, as described above (see STEPs 112 to 114 in FIG. 2). On the other hand, if the determination result is affirmative (YES in STEP 122 in FIG. 4), the second server arithmetic processing element 12 associates the first unique identifier assigned to the first client 210 and the second unique identifier assigned to the second client 220 with each other, and stores and holds the associated first and second unique identifiers in the server storage device 10 (STEP 123 in FIG. 4).

The second server arithmetic processing element 12 considers an attribute (an operation history or a probe information history, etc.) of the second client 220 assigned the second unique identifier or a moving body loaded with the second client 220, and provides a content or an application to the first client 210 assigned the first unique identifier associated with the second unique identifier and registered (STEP 124 and Arrow X31 in FIG. 4). The first client 210 outputs the received content or application to the output device 232 (STEP 216 in FIG. 4).

More specifically, when it is detected that a movement path by the moving body has a predetermined pattern from the probe information history on the second client 220, information (road traffic information or weather information, etc.) relating to an area surrounding the movement path may be read out of the server storage device 10 or a database server by the second server arithmetic processing element 12, and server route information created after the read information is considered may be transmitted to the first client 210 (see Arrow X14 in FIG. 2). For example, the client route r illustrated in FIG. 7A becomes a client route considering a movement pattern of the second client 220 or the moving body loaded with the second client 220. The same is true for a case where it is detected that the movement path by the moving body has a predetermined pattern from the probe information history on the second client 220.

When it is detected that a movement start time slot and a movement start area by the moving body has a predetermined pattern from the probe information history on the second client 220, information (road traffic information or weather information, etc.) related to the movement start area (and its surrounding area) may be read out of the server storage device 10 or the database server by the second server arithmetic processing element 12, and the information and information corresponding thereto may be transmitted to the first client 210 shortly before the movement start time slot. For example, the information is displayed while being overlaid on a map in respective formats of contents C1 and C2, as illustrated in FIG. 7B. The same is true for a case where it is detected that each of the movement end time slot and the movement end area by the moving body has a predetermined pattern from the probe information history on the second client 220.

Figure 5:
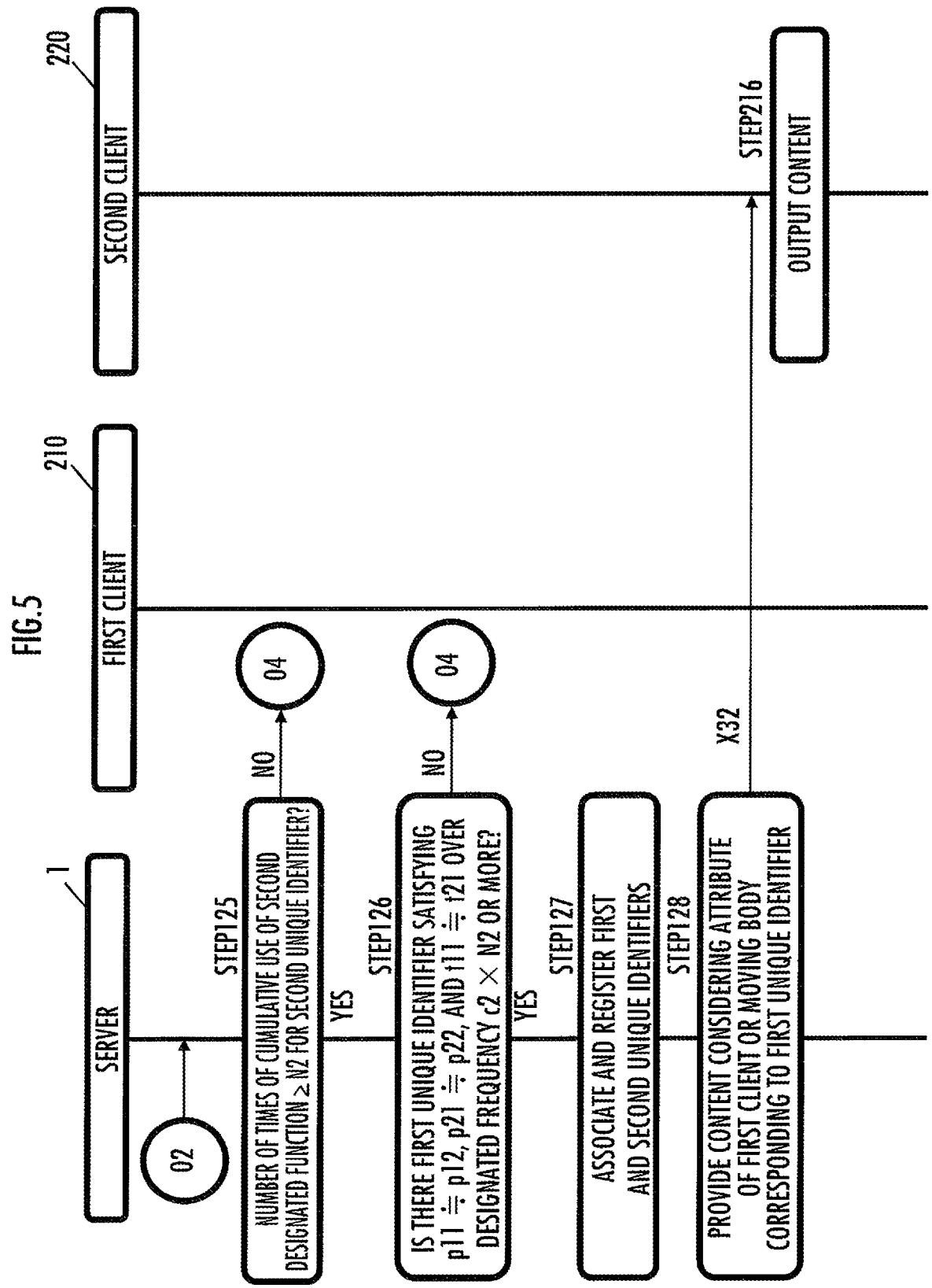
FIG. 5 is a diagram illustrating a second cooperative function of the server and the second client.

In the server 1, if it is determined that the number of times of cumulative use of the second designated function in the second client 220 is one or more (NO in STEP 115 in FIG. 3), the first server arithmetic processing element 11 determines whether the number of times is N2 (>2) or more (STEP 125 in FIG. 5).

If the determination result is negative (NO in STEP 125 in FIG. 5), the first server arithmetic processing element 11 performs processing for recognizing the second ending point position p22 or the like, for example, based on the communication with the second client 220, as described above (see STEPs 117 to 118 in FIG. 3). On the other hand, if the determination result is affirmative (YES in STEP 125 in FIG. 5), the second server arithmetic processing element 12 determines the presence or absence of the first client 210 having the first factor (the first starting point position p11, the first ending point position p12, and the first starting point time t11) the degree of approximation from the second factor (the second starting point position p21, the second ending point position p22, and the second starting point time t21) of the second client 220 identified by the second unique identifier of which is a reference value or more over a second designated frequency c2×N2 (0<c2≤1) or more (STEP 126 in FIG. 5).

If the determination result is negative (NO in STEP 126 in FIG. 5), the first server arithmetic processing element 11 performs processing for recognizing the second ending point position p22 or the like, for example, based on the communication with the second client 220, as described above (see STEPs 117 to 118 in FIG. 2). On the other hand, if the determination result is affirmative (YES in STEP 126 in FIG. 5), the second server arithmetic processing element 12 associates the first unique identifier assigned to the first client 210 and the second unique identifier assigned to the second client 220 with each other, and stores and holds the associated first and second unique identifiers in the server storage device 10 (STEP 127 in FIG. 5).

The second server arithmetic processing element 12 considers an attribute (a display history of various contents, etc.) of the first client 210 assigned the first unique identifier, and provides a content or an application to the second client 220 assigned the second unique identifier associated with the first unique identifier and registered (STEP 128 and Arrow X32 in FIG. 5).

More specifically, when it is detected that there is an application (e.g., a music application) with a high use frequency from an application use history by the first client 210, the application or an application (e.g., a music or video application) highly related thereto may be read out of the server storage device 10 or the database server by the second server arithmetic processing element 12 and transmitted to the second client 220.

The second client 220 outputs a received content or application to the output device 232 (STEP 226 in FIG. 5).

(Function and Effect)

According to the server client system fulfilling the above-described function and the server 1 constituting the server client system, the first server arithmetic processing element 11 assigns the unique identifier to each of the clients 210 and 220 (see STEP 111 in FIG. 2 and STEP 116 in FIG. 3). The unique identifier is merely for identifying each of the clients. Therefore, a user (a natural person or a juridical person) of each of the clients 210 and 220 is not specified by the unique identifier, and protection of his or her privacy or personal information is ensured.

Among the respective factors relating to detected states or set states in the clients 210 and 220 recognized by the first server arithmetic processing element 11, the plurality of factors having a designated relationship thereamong are extracted by the second server arithmetic processing element 12. More specifically, a combination of the first factor and the second factor, between which the degree of approximation is a reference value or more over the designated frequency $c1 \times N1$ or $c2 \times N2$ or more is extracted (see STEP 122 in FIG. 4 and STEP 126 in FIG. 5). The plurality of unique identifiers respectively corresponding to the plurality of factors extracted by the second server arithmetic processing element 12 are associated with one another and are stored and held in the server storage device 10 (see STEP 123 in FIG. 4 and STEP 127 in FIG. 5). When the plurality of factors have a designated relationship thereamong, respective users of the plurality of clients 210 and 220 each corresponding to the plurality of factors are highly probable to have any relationship or commonality, e.g., the same person, acquaintances, friends, persons common in affiliation, or relatives.

Accordingly, the server 1 according to the present invention enables the unique identifier assigned to each of the plurality of clients 210 and 220 of the users who are highly probable to have any relationship or commonality to be registered in the server storage device 10 in an appropriate format from the viewpoint of an improvement in usefulness of a service such as a content provided to the client, for example.

When the respective users of the first client 210 and the second client 220 are highly probable to be the same person, for example, if a content or an application is provided to only the one client 210, a minimum service required for the user can be enjoyed, resulting in no complexity and high usefulness or convenience.

Another Embodiment of Present Invention

While a "position" of the client has been adopted as a "state" serving as a detection or setting target of each of the clients 210 and 220 in the above-described embodiment, various states such as an operating state of any application such as a designated application or an output state of a content in each of clients 210 and 220 may be included as a corresponding state in another embodiment. The state is defined as a scaler or a vector using continuous variables or discrete variables as elements, for example.

While it is defined that a first factor and a second factor have a designated relationship therebetween when the degree of approximation therebetween is a reference value or more over a designated frequency or more in the above-described embodiment, it may be defined that the first factor and the second factor have a designated relationship therebetween when the degree of approximation is a reference value or more only once. It may be defined that the first factor and the second factor have a designated relationship therebetween not only when the degree of approximation therebetween is the reference value or more but also when the degree of approximation therebetween is a first reference value or more and a second reference value or less. It may be defined that the first factor and the second factor have a designated relationship therebetween when a relative arrangement relationship in a multidimensional space such as a Hilbert space between points respectively representing the first factor and the second factor serving as a multidimensional vector corresponds to a predetermined relationship.

In a server 1 or the like according to another embodiment of the present invention, a second server arithmetic processing element 12 may extract, when a deviation between a first starting point time t11 (or a second starting point time t21) and a second ending point time t22 (or a first ending point time t12) is in a designated range corresponding to a deviation between a first starting point position p11 or a second starting point position p21 and a first ending point position p12 or a second ending point position p22, the first factor and the second factor as a plurality of factors having a designated relationship thereamong. When a difference of the deviation between the times (t22−t11) from a standard movement time or travel time from the second starting point position p21 to the second ending point position p22 is included in a designated range, a first unique identifier and a second unique identifier respectively corresponding to the first factor and the second factor may be associated with each other and registered in a server storage device 10 (see STEP 123 in FIG. 4 and STEP 127 in FIG. 5).

The first client 210 and the second client 220 may be configured to be cooperative with each other so that one of the clients uses or complements a function of the other client by mutual communication using Bluetooth (registered trademark), and the time when a communication state with the second client 220 in the first client 210 has been established may be detected as the first starting point time t11. The time when the communication state with the second client 220 in the first client 210 has been released may be detected as the first ending point time t12.

What is claimed is:

1. A server comprising:
    a processor;
    a memory comprising a program; and
    wherein the processor is configured to execute the program causing the server to perform
    a first server arithmetic process comprising
        assigning different unique identifiers for identifying each of a plurality of clients serving as mobile stations to each of the plurality of clients serving as mobile stations in response to a first use of a designated function or a designated application for detecting or setting a state in each of the plurality of clients,
        recognizing a combination of a factor relating to states set or detected in each of the plurality of clients and the unique identifier, and
        recognizing a first ending point state which is a target state set in a first client as an information terminal carried by a user, constituting the plurality of clients and a second ending point state serving as a state corresponding to the first ending point state detected in a second client, loaded into a vehicle moving according to a user's operation, constituting the plurality of clients, the second client being separate from the first client, as the factors which are determined whether or not having a designated relationship therebetween by a second server arithmetic process; and the second server arithmetic process comprising
extracting, among the respective factors in the plurality of clients recognized by the first server arithmetic process, designated factors wherein the designated factors comprise the plurality of factors having the designated relationship thereamong,
associating a plurality of unique identifiers, wherein the combination comprises the associated unique identifiers and the designated factors,
storing the associated unique identifiers in the server storage device,
evaluating a degree of approximation among the respective factors in the plurality of clients recognized by the first server arithmetic process, and wherein the designated relationship comprises the degree of approximation with the plurality of factors being a reference value or more, and
providing, to the second client, a content or an application of an attribute of the first client which has the designated relationship with the second client.

2. The server according to claim 1, wherein
the second server arithmetic process further comprises extracting the plurality of factors with the degree of approximation being the reference value or more over a designated frequency or more as the plurality of factors having the designated relationship thereamong.

3. The server according to claim 1, wherein
the first server arithmetic process further comprises respectively recognizing a first starting point state which is a state detected in setting the first ending point state in the first client and a second starting point state which is a state, corresponding to the first starting point state and detected in the second client, as the factors which are determined whether or not having the designated relationship therebetween by the second server arithmetic process.

4. The server according to claim 3, wherein
the first server arithmetic process further comprises respectively recognizing a first starting point time corresponding to a set time of the first ending point state or a detection time of the first starting point state in the first client and a second starting point time corresponding to a detection time of the second starting point state in the second client as the factors which are determined whether or not having the designated relationship therebetween by the second server arithmetic process.

5. The server according to claim 4, wherein
the first server arithmetic process further comprises recognizing a time when a communication state with the second client in the first client has been released as a first ending point time.

6. The server according to claim 3, wherein the first server arithmetic process further comprises recognizing a first starting point position as at least a apart of the first starting point state and a second starting point position as at least a part of the second starting point state as the factors, and
the degree of approximation is defined so as to increase more continuously or intermittently as a geographic distance between the first starting point position and the second starting point position is shorter.

7. The server according to claim 1, wherein
the first server arithmetic process further comprises recognizing a first ending point time corresponding to a time when the first ending point state is implemented in the first client as the factor in the first client, and respectively recognizing a second ending point time corresponding to a detection time of the second ending point state in the second client as the factors which are determined whether or not having the designated relationship therebetween by the second server arithmetic process.

8. The server according to claim 3, wherein
the first server arithmetic process further comprises respectively recognizing a first starting point time corresponding to a set time of the first ending point state or a detection time of the first starting point state in the first client and a second ending point time corresponding to a detection time of the second ending point state in the second client as the factors, and
the second server arithmetic process further comprises extracting the factor in the first client and the factor in the second client as the plurality of factors having the designation relationship therebetween when a deviation between the first starting point time and the second ending point time is in a designated range corresponding to a deviation between the first starting point state or the second starting point state and the first ending point state or the second ending point state.

9. The server according to claim 4, wherein
the first server arithmetic process further comprises recognizing a start up time of a moving body loaded with the second client as the second starting point time.

10. The server according to claim 7, wherein
the first server arithmetic process further comprises recognizing a stop operation time of the moving body loaded with the second client as the second ending point time.

11. The server according to claim 7, wherein
the first server arithmetic process further comprises recognizing a time when a communication state with the second client in the first client has been established as the first starting point time.

12. The server according to claim 8, wherein
the first server arithmetic process further comprises recognizing a time when a communication state with the second client in the first client has been released as a first ending point time.

13. The server according to claim 1, wherein
the first server arithmetic process further comprises respectively recognizing positions set or detected in the plurality of clients as the factors which are determined whether or not having the designated relationship therebetween by the second server arithmetic process.

14. The server according to claim 1, wherein
the first server arithmetic process further comprises providing, based on communication with at least one of the plurality of clients constituting a client group respectively assigned with the plurality of unique identifiers associated with one another and stored by the server storage device, an application or a content corresponding to at least one of the factor and the designated relationship to the at least one client.

15. A server client system including a server and a plurality of clients serving as mobile stations, wherein the server comprises:

a processor;

a memory comprising a program; and wherein the processor is configured to execute the program causing the server to perform a first server arithmetic process comprising assigning different unique identifiers for identifying each of a plurality of clients serving as mobile stations to each of the plurality of clients in response to a first use of a designated function or a designated application for detecting or setting a state in each of the plurality of clients, recognizing a combination of a factor relating to states set or detected in each of the plurality of clients and the unique identifier, and recognizing a first ending point state which is a target state set in a first client as an information terminal carried by a user, constituting the plurality of clients and a second ending point state serving as a state corresponding to the first ending point state detected in a second client, loaded into a vehicle moving according to a user's operation, constituting the plurality of clients, the second client being separate from the first client, as the factors which are determined whether or not having a designated relationship therebetween by a second server arithmetic process; and the second server arithmetic process comprising extracting, among the respective factors in the plurality of clients recognized by the first server arithmetic process, designated factors wherein the designated factors comprise the plurality of factors having a designated relationship thereamong, associating a plurality of unique identifiers, wherein the combination comprises the associated unique identifiers and the designated factors, storing the associated unique identifiers in the server storage device, evaluating a degree of approximation among the respective factors in the plurality of clients recognized by the first server arithmetic process, and wherein the designated relationship comprises the degree of approximation with the plurality of factors being a reference value or more, and providing, to the second client, a content or an application of an attribute of the first client which has the designated relationship with the second client.

\* \* \* \* \*